(12) United States Patent
Isgar

(10) Patent No.: US 12,067,635 B2
(45) Date of Patent: Aug. 20, 2024

(54) SOCIAL MEDIA FINAL NOTIFICATION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 25 days.

(21) Appl. No.: 17/693,675

(22) Filed: Mar. 14, 2022

(65) Prior Publication Data
US 2022/0198594 A1    Jun. 23, 2022

Related U.S. Application Data

(63) Continuation-in-part of application No. 16/686,608, filed on Nov. 18, 2019, now abandoned, which is a continuation of application No. 15/996,360, filed on Jun. 1, 2018, now abandoned.

(60) Provisional application No. 62/588,014, filed on Nov. 17, 2017.

(51) Int. Cl.
*G06Q 50/18* (2012.01)
*G06F 21/62* (2013.01)
*G06Q 50/00* (2024.01)

(52) U.S. Cl.
CPC ....... *G06Q 50/186* (2013.01); *G06F 21/6245* (2013.01); *G06Q 50/01* (2013.01)

(58) Field of Classification Search
CPC ... G06Q 50/186; G06Q 50/01; G06F 21/6245
See application file for complete search history.

(56) References Cited

U.S. PATENT DOCUMENTS

| 10,949,937 B1 * | 3/2021 | Watt Lagnese ............................. G06Q 10/063114 |
| 11,805,090 B1 * | 10/2023 | Kattel .................. H04L 51/234 |
| 11,875,420 B1 * | 1/2024 | Watt Lagnese ...... G06Q 10/101 |

(Continued)

FOREIGN PATENT DOCUMENTS

| WO | WO-2014182882 A1 * | 11/2014 | ............. G06Q 40/08 |
| WO | 2016100511 | 6/2016 | |

OTHER PUBLICATIONS

Anonymous "'If I die . . . 'the Facebook app that records 'final words'," The Herald, pp. n/a, 2017 (Year: 2017).*

(Continued)

*Primary Examiner* — Gerardo Araque, Jr.
(74) *Attorney, Agent, or Firm* — Schmeiser, Olsen & Watts LLP

(57) ABSTRACT

A social media final notification and digital asset management system is provided. The system includes a server comprising storing user data corresponding to social media platforms and legacy representative data stored on the server. The system includes a user computing device operated by a legacy representative coupled to the computer server. The server may be programmed to receive from the user computing device a signal indicating a person associated with the user data is deceased. The server may be programmed to retrieve the user data, generate and transmit to the social media platforms a final message stored in the user data by the deceased person prior to death. The server may be programmed to cancel the social media accounts a predetermine amount of time after close of the social media accounts. The legacy representative may access the cloud storage accounts aggregated on the server and save to a different location.

1 Claim, 21 Drawing Sheets

(56) References Cited

U.S. PATENT DOCUMENTS

| | | | | |
|---|---|---|---|---|
| 2006/0178967 | A1* | 8/2006 | Jung | A63F 13/12 |
| | | | | 705/35 |
| 2007/0061160 | A1* | 3/2007 | Fisher | G06Q 10/10 |
| | | | | 705/1.1 |
| 2012/0016803 | A1* | 1/2012 | Tharp | H04L 51/214 |
| | | | | 705/319 |
| 2012/0047055 | A1 | 2/2012 | Aiello | |
| 2013/0060874 | A1 | 3/2013 | Stephens | |
| 2013/0080532 | A1 | 3/2013 | Stewart | |
| 2014/0337059 | A1* | 11/2014 | Simon | G06Q 50/01 |
| | | | | 705/4 |
| 2015/0095243 | A1* | 4/2015 | Eiler | G06Q 50/186 |
| | | | | 705/312 |
| 2015/0101026 | A1 | 4/2015 | Kraus | |
| 2015/0254794 | A1 | 9/2015 | Levin et al. | |
| 2016/0261635 | A1* | 9/2016 | Rajagopalan | H04L 63/10 |
| 2016/0344675 | A1 | 11/2016 | Samaras et al. | |
| 2017/0091887 | A1* | 3/2017 | Allinson | G06Q 40/12 |
| 2017/0308820 | A1* | 10/2017 | Amante | G06Q 10/02 |
| 2019/0182342 | A1 | 6/2019 | Goenka et al. | |
| 2020/0311252 | A1* | 10/2020 | Huziak | G06F 9/547 |
| 2023/0401661 | A1* | 12/2023 | Lacher | G06Q 50/186 |
| 2023/0419397 | A1* | 12/2023 | Kushner | G06Q 30/0201 |

OTHER PUBLICATIONS

W. Gathu, "So, what happens to your digital self when you die?" Daily Nation, pp. n/a, 2017 (Year: 2017).*

Anonymous "How to handle settling a loved one's estate," Capital, pp. D.6, 2010 (Year: 2010).*

T. Mcbride, "Executors need legal access to digital estate," Star—Phoenix, pp. C.4, 2016 (Year: 2016).*

S. Proudfoot, "Death and the Internet—creating a digital will; Planning: New services tie up loose ends in the virtual world," Telegraph-Journal, pp. B.2, 2010 (Year: 2010).*

K. C. Prangley, R. L. Haller and A. W. Coventry, "Web of Estate Planning Considerations for Digital Assets," Estate Planning, vol. 40, (5), pp. 3-12, 2013 (Year: 2013).*

N. Cahn, "Postmortem Life On-line," Probate and Property, vol. 25, (4), pp. 36-39, 2011 (Year: 2011).*

G. W. Beyer, "Web Meets the Will: Estate Planning for Digital Assets," Estate Planning, vol. 42, (3), pp. 28-41, 2015 (Year: 2015).*

Rouse "What is Data Scrubbing" Definition from Techopedia Oct. 9, 2012, https://www.techopedia.com/definition/14651/data-scrubbing (Year: 2012).*

J. Sanders, "Your Digital Legacy: New Problems For The Facebook Generation," Mondaq Business Briefing, pp. NA, 2019 (Year: 2019).*

Anonymous "Online life continues long after death, " Lansing State Journal, pp. C.6, 2012 (Year: 2012).*

Anonymous, "A Smart Method to Unlock and Create Collaborative and Connection Opportunity from Dormant Email Address of the Deceased" email account holder, An IP.com Prior Art Database Technical Disclosure, IP.com No. IPCOM000222602D, Oct. 18, 2012 (2012).

L. Bahri, B. Caminati and E. Ferrari, "What Happens to My Online Social Estate When I Am Gone? An Integrated Approach to Posthumous Online Data Management," 2015 IEEE International Conference on Information Reuse and Integration, San Francisco, CA 2015, pp. 31-38 (2015).

J. Braman, A. Dudley and G. Vincenti, "Death, Social Networks and Virtual Worlds: A Look Into the Digital Afterlife," 2011 Ninth International Conference on Software Engineering Research, Management and Applications, Baltimore, MD, 2011, pp. 186-192 (2011).

C. Peoples and M. Hetherington, "The Cloud Afterlife: Managing Your Digital Legacy," 2015 IEEE International Symposium on Technology and Society (ISTAS), Dublin, 2015, pp. 1-7. (2015).

L.A. Castro and V.M. Gonzalez, "Afterlife Presence on Facebook: A Preliminary Examination of Wall Posts on the Deceased's Profiles," CONIELECOMP 2012, 22nd International Conference on Electrical Communications and Computers, Cholula, Puebla, 2012, pp. 355-360 (2012).

Sadler, "How to Reduce, or Even Erase, Your Digital Footprint," clark.com, Oct. 31, 2017, https://clark.com/technology/how-to-reduce-or-delete-your-digital-footprint/ (Year: 2017).

Franklin, "6 Ways to Delete Yourself from the Internet," C|Net Tech, Oct. 1, 2021, https://www.cnet.com/tech/services-and-software/remove-delete-yourself-from-internet/ (Year: 2021).

Komando, "How to Delete Yourself from the Internet," USA Today Tech, Jun. 23, 2017, https://www.usatoday.com/story/tech/columnist/komando/2017/06/23/how-to-delete-yourself-from-the-internet/102890400/ (Year: 2017).

* cited by examiner

NOTICE TO USER FROM DIGITAL ASSET MANAGER THAT STORED LOGIN CREDENTIALS ARE INCORRECT

SOCIAL MEDIA FINAL NOTIFICATION SYSTEM

CROSS REFERENCE TO RELATED APPLICATION[S]

This application is a continuation-in-part of the earlier U.S. Utility patent application Ser. No. 16/686,608, filed Nov. 18, 2019, which is a continuation of the earlier U.S. Utility patent application Ser. No. 15/996,360, filed Jun. 1, 2018, which claims priority to U.S. Provisional Patent Application Ser. No. 62/588,014, filed Nov. 17, 2017, the disclosures of which are hereby incorporated entirely herein by reference.

BACKGROUND OF THE INVENTION

Technical Field

This invention relates generally to an asset management system and more particularly to a system for managing and terminating social media assets and aggregating and managing digital assets including cloud storage assets and the like for managing before and after the person's death.

State of the Art

The use of social media is common with millions of users of various types of platforms. A person's social media accounts typically remain active after that person dies. This results in valuable information that can become vulnerable. This is particularly concerning given that at least 8,000 Facebook users die each day. Family and estates are then responsible for taking the necessary steps to terminate or memorialize the social media accounts of the deceased. These steps can be burdensome difficult and near impossible, particularly if the deceased has not left the information necessary to terminate or memorialize the social media accounts he or she had. Further, each social media platform may have different procedures for terminating or memorializing the accounts.

Additionally, as technology has developed the accessibility and utilization of cloud storage has increased. This increase has been for not only business uses but also for personal uses. The files stored in these cloud storage services have value, both sentimental and monetary, thereby making them digital assets. However, there are not systems that address what is to happen to these digital assets at the passing of an individual.

Accordingly, there is a need for a digital asset management to hand the winding down of social media accounts and the aggregation and management of digital assets at the death of an individual.

DISCLOSURE OF THE INVENTION

The present invention relates to a social media final notification system for notifying all social media platforms subscribed to by a person of that person's death. The present invention further relates to a digital asset management system for aggregating and managing digital assets including cloud storage assets and the like for managing before and after the person's death An embodiment includes a social media final notification system comprising: a computer server comprising a memory storing user data corresponding to the more than one social media platforms, wherein the user data includes login credentials, and storing legacy representative data including legacy representative login credentials; and a user computing device operable by a legacy representative coupled to the computer server, the computer server programmed to: receive from the user computing device a signal indicating a person associated with the user data is deceased, wherein the signal is sent without confirming documentation of the death of the person associated with the user data; automatically process the signal received from the user computing device and retrieve the stored user data; using the user data retrieved, post a final message to the more than one social media platforms, the final message saved as part of the user data as entered by the deceased person; automatically close social media accounts within a predetermined time as determined by the deceased person and saved in the user data; and automatically scrub an online presence of the deceased person after closing of the more than one social media accounts.

Another embodiment includes a digital asset management system comprising: a computer server comprising a memory storing user data corresponding to the more than one social media platforms and more than one cloud storage accounts having digital assets aggregated in the memory of the server, wherein the user data includes login credentials, and storing legacy representative data including legacy representative login credentials; and a user computing device operable by a legacy representative coupled to the computer server, the computer server programmed to: receive from the user computing device a signal indicating a person associated with the user data is deceased, wherein the signal is sent without confirming documentation of the death of the person associated with the user data; automatically process the signal received from the user computing device and retrieve the stored user data; using the user data retrieved, post a final message to the more than one social media platforms, the final message saved as part of the user data as entered by the deceased person; automatically close social media accounts within a predetermined time as determined by the deceased person and saved in the user data; receive a signal from the user computing device a signal to access aggregated cloud storage accounts, wherein the user computing device operates to save the files to a different storage location; and automatically scrub an online presence of the deceased person after closing of the more than one social media accounts.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a social media final notification system for notifying all social media platforms subscribed to by a person of that person's death.

Figure 1:
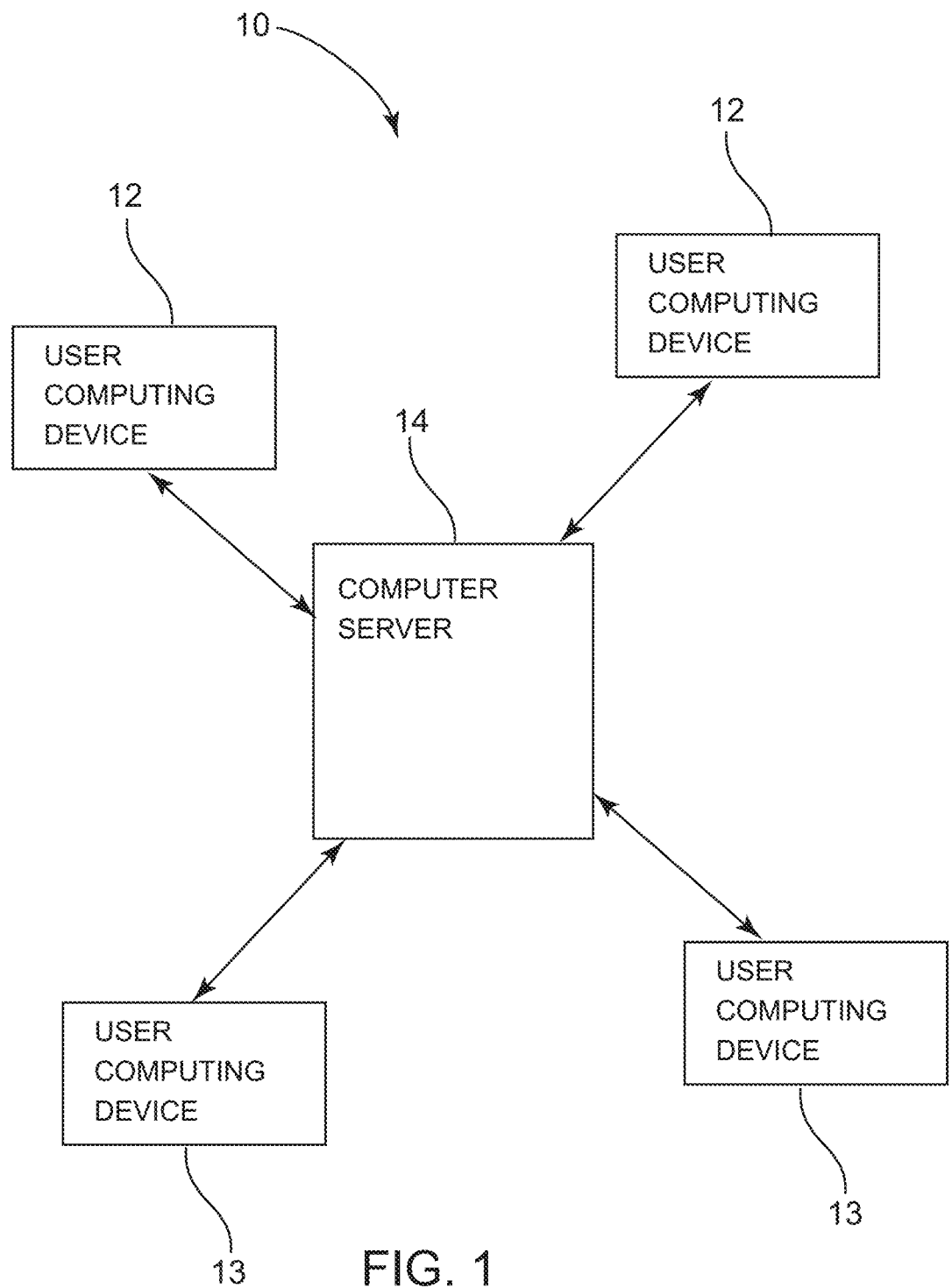
FIG. 1 is a diagrammatic view of a social media final notification system and a digital asset management system in accordance with an embodiment.
Figure 2:
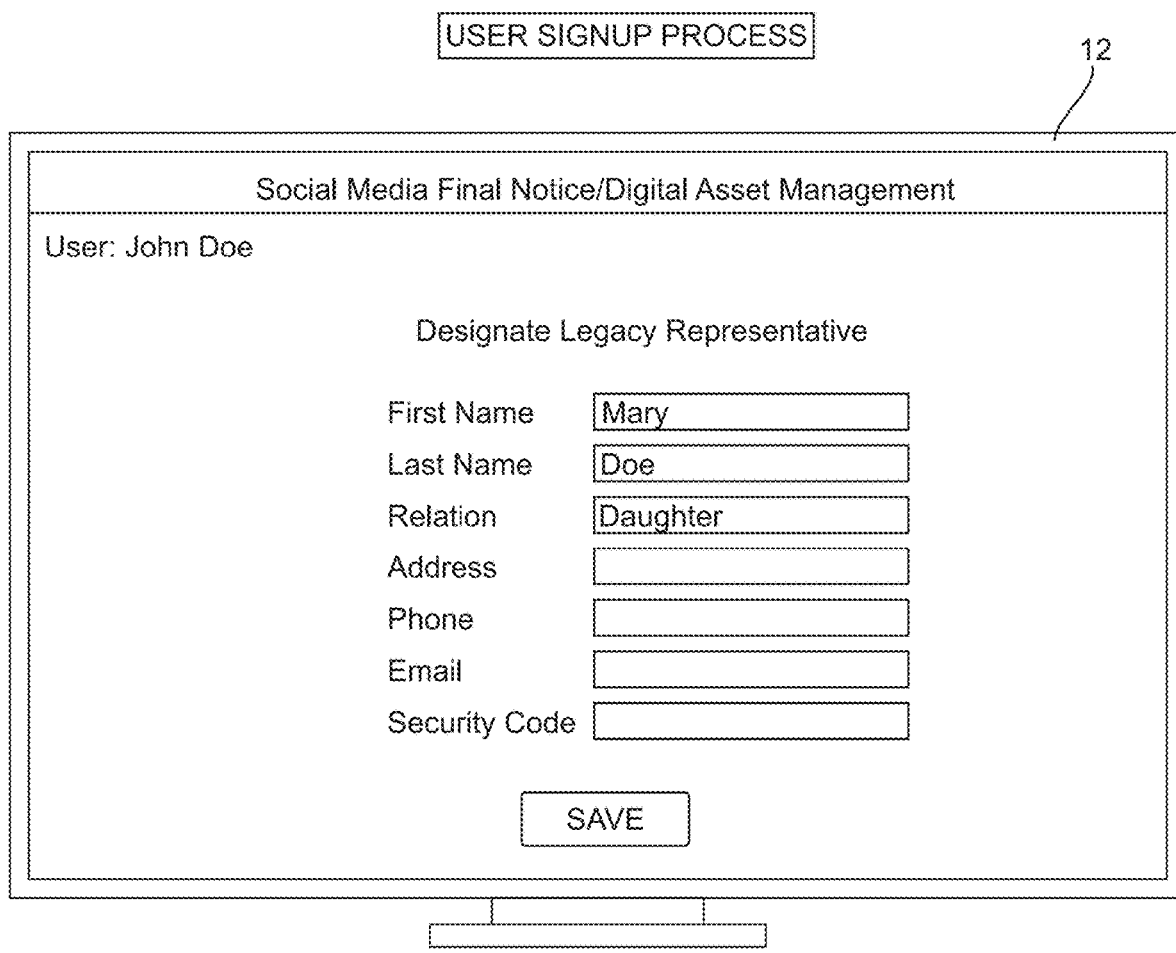
FIG. 2 is a view of a user interface on a user computing device with a user signing up for a social media final notice system/digital asset management system in accordance with an embodiment.
Figure 3A:
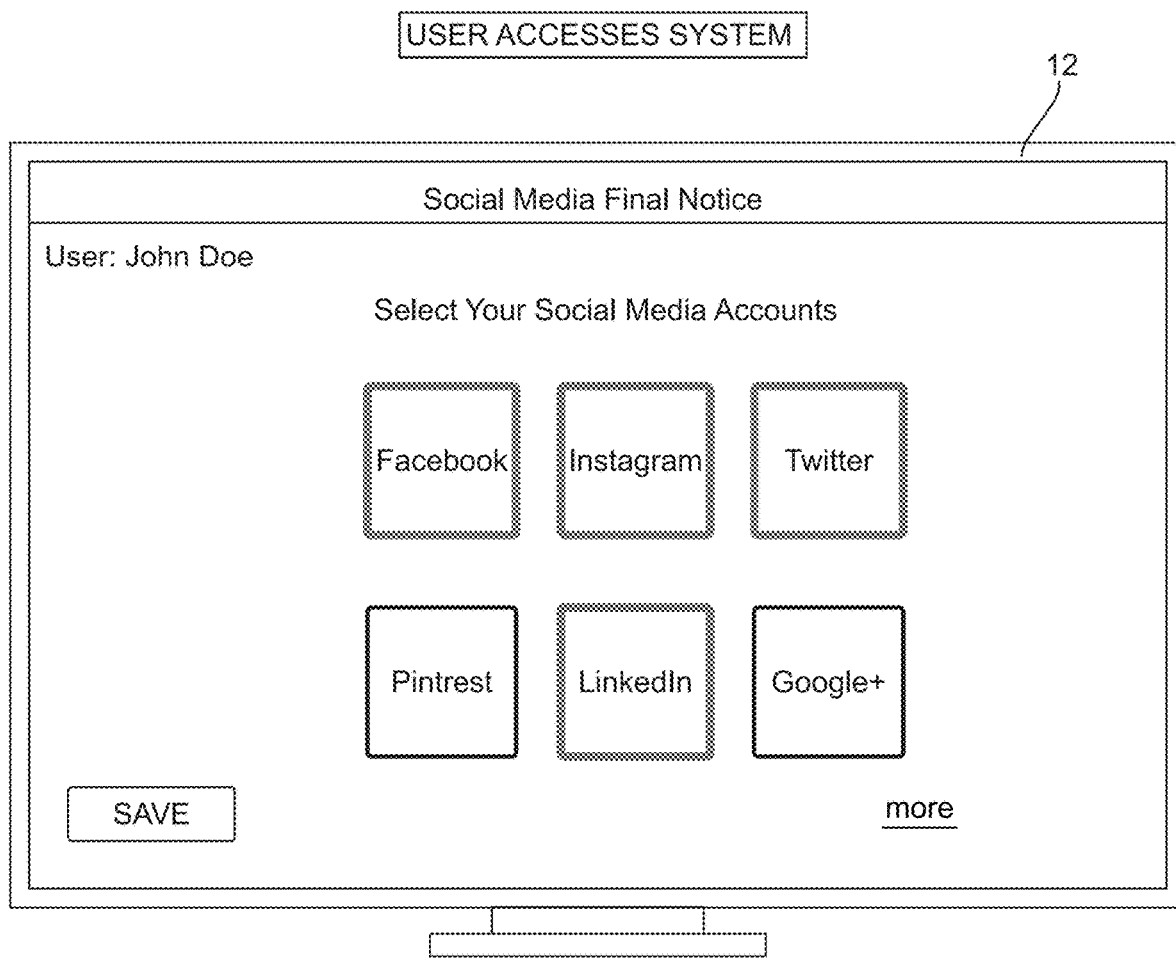
FIG. 3A is a view of a user interface on a user computing device with a user managing a social media final notice system in accordance with an embodiment.
Figure 3B:
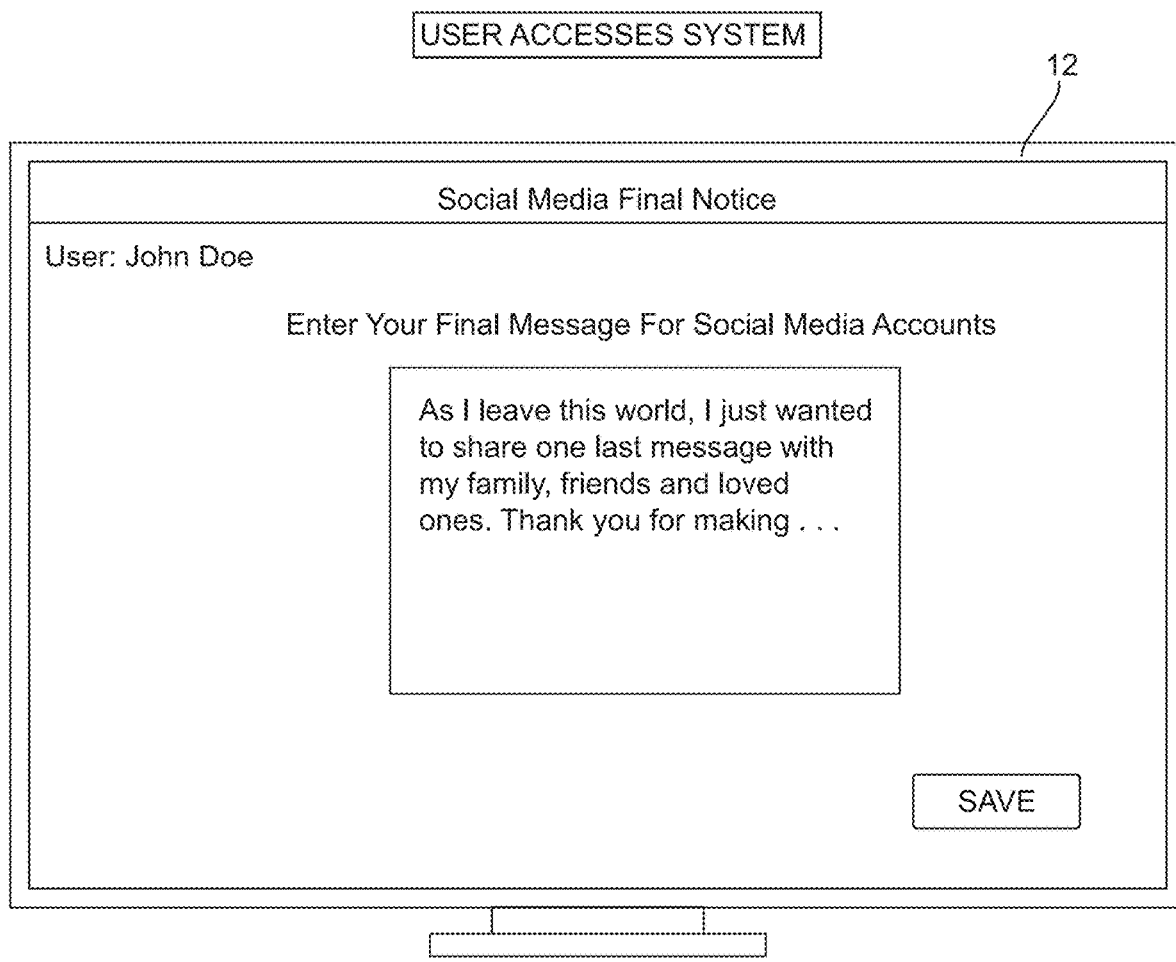
FIG. 3B is a view of a user interface on a user computing device with a user managing a social media final notice system in accordance with an embodiment.
Figure 3C:
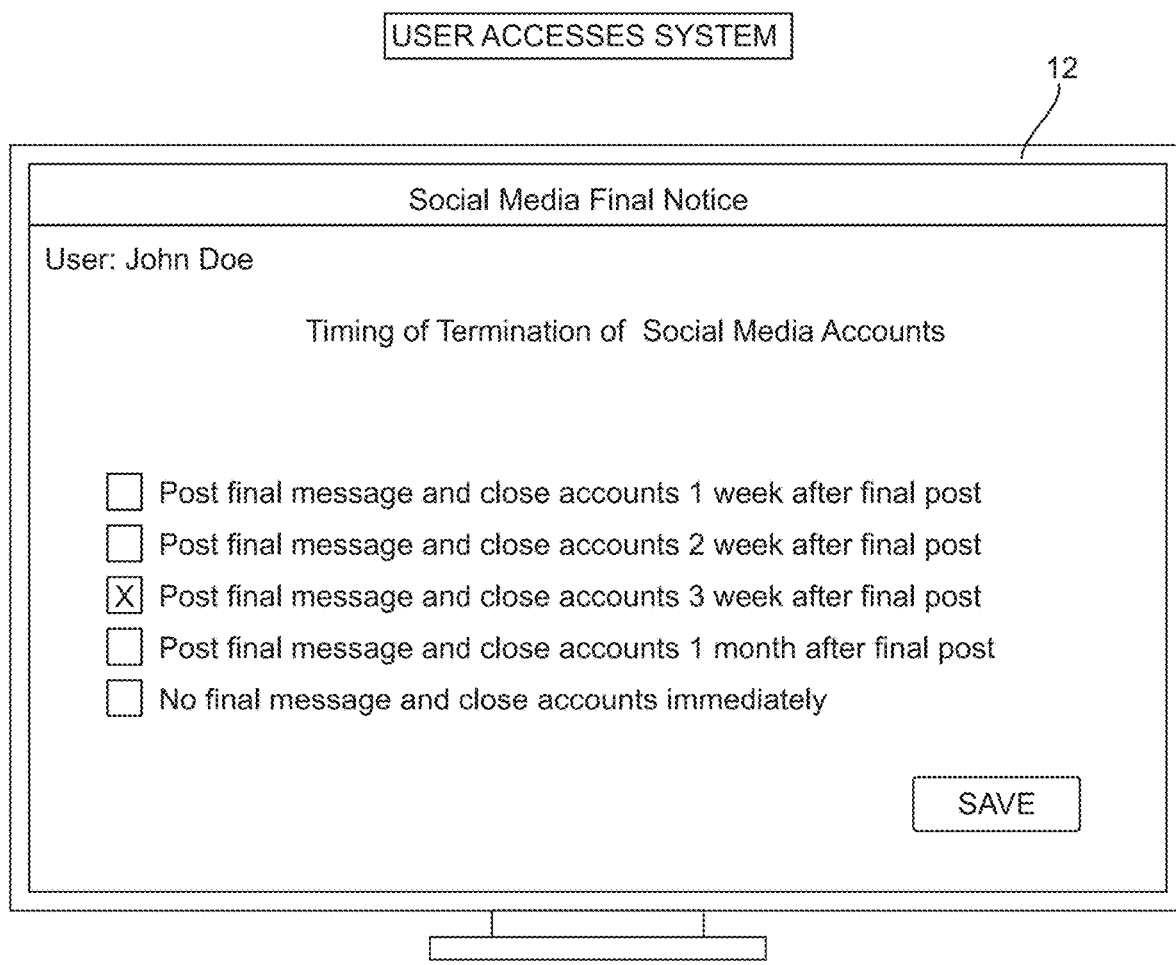
FIG. 3C is a view of a user interface on a user computing device with a user managing a social media final notice system in accordance with an embodiment.

Referring to the drawings, FIG. 1 depicts an embodiment of a social media final notification system 10 or a digital asset management system 10. The system 10 may include user computing devices 12 and 13 and a computer server 14, wherein the user computing devices 12 and 13 are coupled to the computer server 14. This coupling may be a network connection, such as through an Internet connection, wherein the user computing devices 12 and 13 may communicate with and receive communication from the server 14.

Social Media Final Notification System

Embodiments may include a social media final notification system 10. Operation of the system 10 is depicted in FIGS. 2-8. The computer server 14 may include a memory storing user data corresponding to one or more social media platforms. The user data includes login information, such as, but not limited to, a username and a password for the one or more social media platforms. The user computing device 12 may be coupled to the server 14, and, referring to FIG. 2, the server 14 may be programmed to receive from the user computing device 12 a signal that the user computing device is seeking to access the system 10 and a user signup for use of the system 10 and further may include designating a legacy representative to initiate the operation of the system 10 at the user's death. The system 10 may require identification information of the legacy representative, including name, relationship to the user, address, phone number, email and a security code that the legacy representative would need to enter in order to access the system.

Once the user is signed up, the user may access the system 12 wherein the server 14 delivers for display on the screen of user computing device 12 a user interface with selectable elements corresponding to available social media accounts (See FIG. 3A), wherein the user selects the social media accounts he or she is signed up for and may be saved. The server 14 may then send for display on the user computing device 12 a user interface that allows the user to enter the login information for each of the selected social media accounts. The server 14 may be programmed to send for display on the user computing device 12 a user interface that allows a user to enter a final message he or she wishes to post on all social media accounts/platforms in the event of the user's death, including any photos or videos or combination thereof (see FIG. 3B). The server 14 may be programmed to send for display on the user computing device 12 a user interface that allows a user to select when all social media accounts/platforms are to be closed after posting the final message on all social media accounts in the event of the user's death (see FIG. 3C). This may include any amount of time after the final message is posted, such as, 1 week, 2 weeks, 3 weeks, a month, or even not to post a final message and close the accounts immediately. This saves a preference on the final message delivery and closing of accounts. The closing of accounts is important for reasons such as fraud, identity theft and so forth. Social media accounts of dead individuals have become a breeding ground for identify theft.

Figure 4:
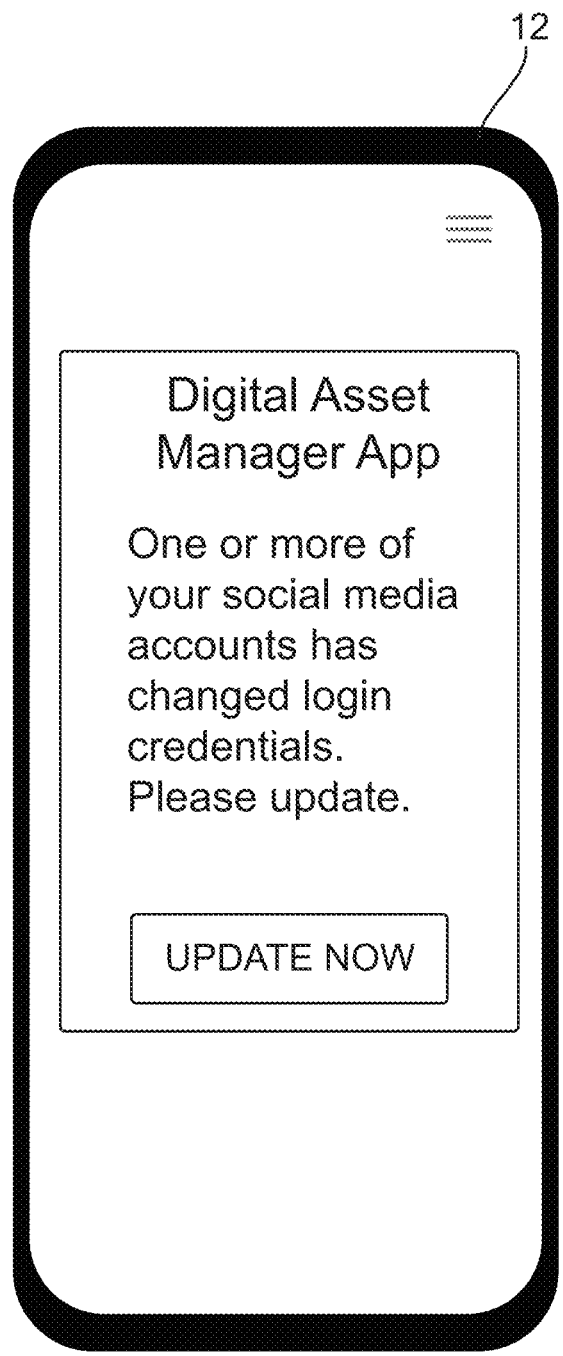
FIG. 4 is a view of a user interface on a user computing device with a notification from a social media final notice system in accordance with an embodiment.

Once the user is signed up and all social media accounts have been saved to the system 10, the server 14 may be programmed to check the login credentials of the user to see if they are currently operable to access the one or more social media accounts of the user. In the event the server 14 cannot login to the one or more social media accounts, the server 14 may send an alert to the user computing device 12, such a visual alert and/or audible alert, such as a text alert as shown in FIG. 4, which may also include an audible or haptic alert as set by the user computing device 12. The alert may include a button allowing the user to select and then update any login credentials that have changed.

Additionally, the system 10 may include the server 14 programmed to automatically perform a search of the user's identity on various or all social media platforms as a recommendation tool for identifying accounts that the user has signed up for. The server 14 may be programmed to send an alert or notification to the user computing device 12 to update the system 10 with the new social media accounts the user has signed up for. The server 14 may be programmed to perform such a search at predetermined times, such as weekly, monthly, semi-annually or any longer or shorter time frame as established by the system.

Figure 5:
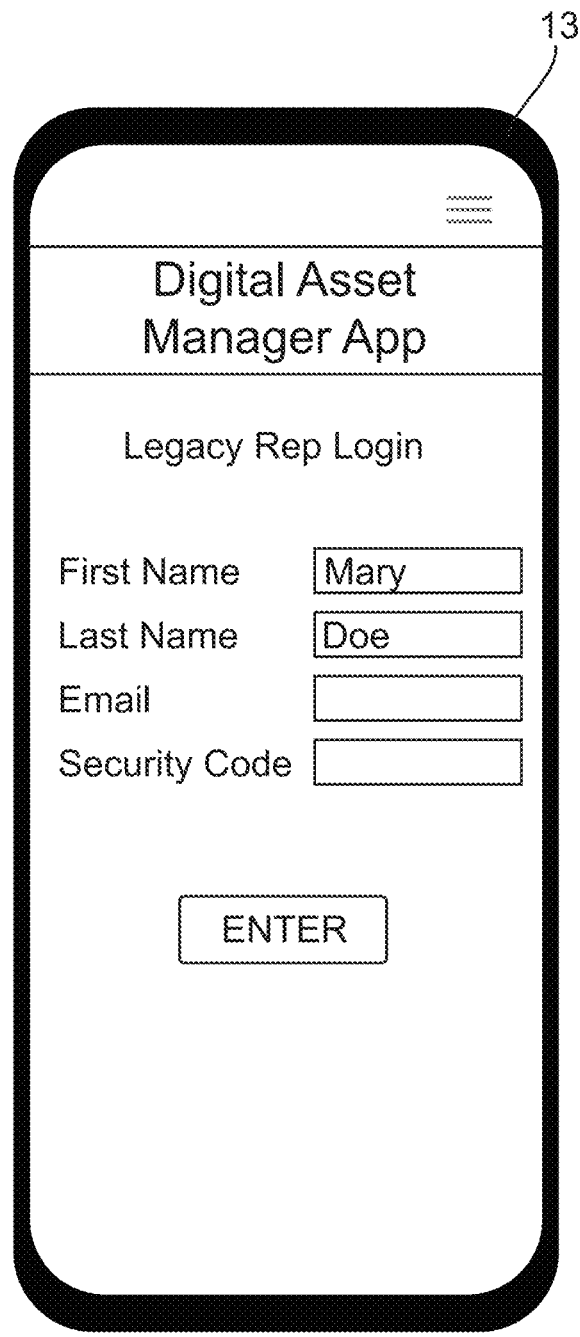
FIG. 5 is a view of a user interface on a legacy representative user computing device accessing a social media final notice system in accordance with an embodiment
Figure 6:
FIG. 6 is a view of a user interface on a legacy representative user computing device accessing a social media final notice system in accordance with an embodiment.
Figure 7:
FIG. 7 is a view of a social media final post on one of the user's social media accounts with a final message in accordance with an embodiment.

The system 10 may also include the server 14 programmed to establish a virtual profile on social media accounts and lined to the user's social media accounts, such as by a friend, follow or the like to test activity of the accounts. This link may be a means for posting a final notice message to the user's social media accounts In the event of the user's death, the legacy representative may access the system 10 and couple to the server 14 through a network connection between the legacy rep user computing device 13. The legacy representative may have login credentials that may include the security code established by the user at signup for the account of the system 10 and enter the login credentials as depicted in FIG. 5. The access of this system may occur relatively quickly after the death of the user without the need of confirming death with a death certificate, social security administration and so forth. Timing is critical in this situation and embodiments may include accessing the system 10 by the legacy representative within 24-48 hours. The server 14 may be programmed to send for display on the user computing device 13 of the legacy rep a screen for activating the system and selecting that the user has passed away (see FIG. 6). Once the legacy rep selects to activate the system 10 for the user, the server 14 may be programmed to automatically access all social media accounts of the deceased user and post the saved final message/post on all social media accounts (see FIG. 7). The post may automatically include an invitation for friends, followers and the like to post kind thoughts. The system may also operate to capture all posts made on the deceased user's social media accounts in response to the final post and provide to the family a digital or hard copy of the deceased user's final post and responses. In addition to capturing of all posts made on the deceased user's social media accounts in response to the final post, embodiments may further include capturing all of the posts and activity on the deceased user's social media accounts and providing them to the family in a digital or hard copy. It will be understood that hard copy may be forms such as paper print outs and the like. The digital copy may be PDF or other digital format that is not the standard format or file type of the social media accounts.

The server 14 may be programmed to automatically perform a shutdown search a predetermined amount of time after the system 10 initiated shut down of the user's social media accounts, wherein the server 14 confirms that all social media accounts included in the system 10 are in fact shut down. The server 14 may then be programmed to notify the legacy representative, such as sending and alert or notification to the user computing device 13 of the legacy rep to communicate confirmation of closing of the accounts.

Figure 8:
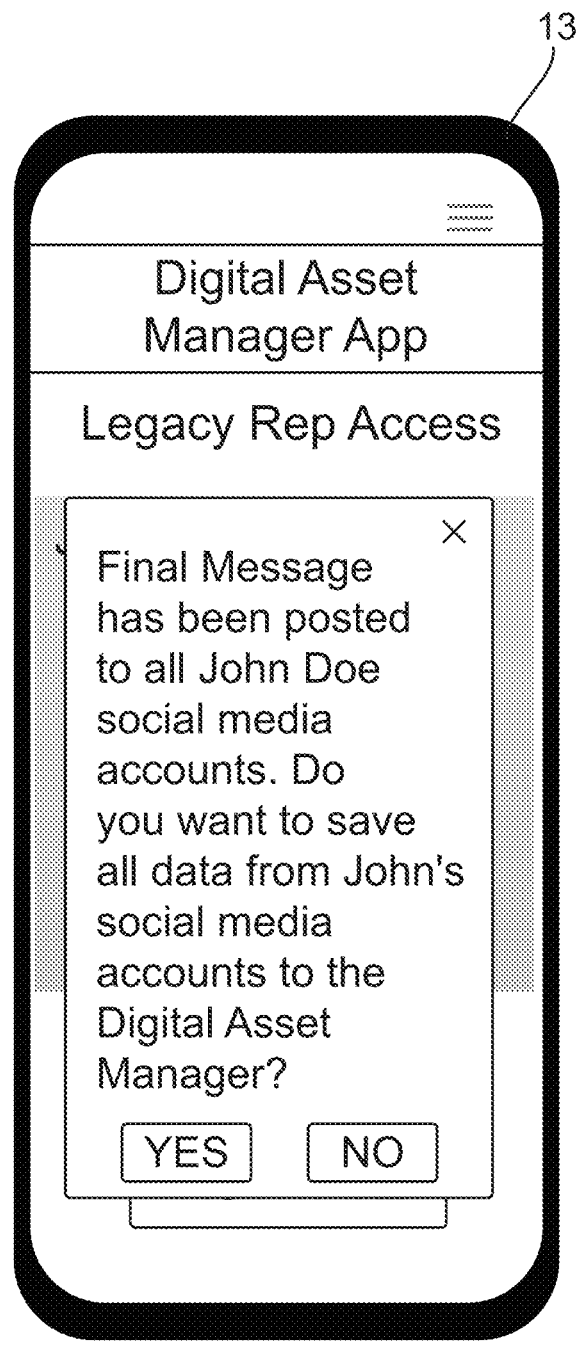
FIG. 8 is a view of a user interface on a legacy representative user computing device accessing a social media final notice system in accordance with an embodiment.
Figure 9:
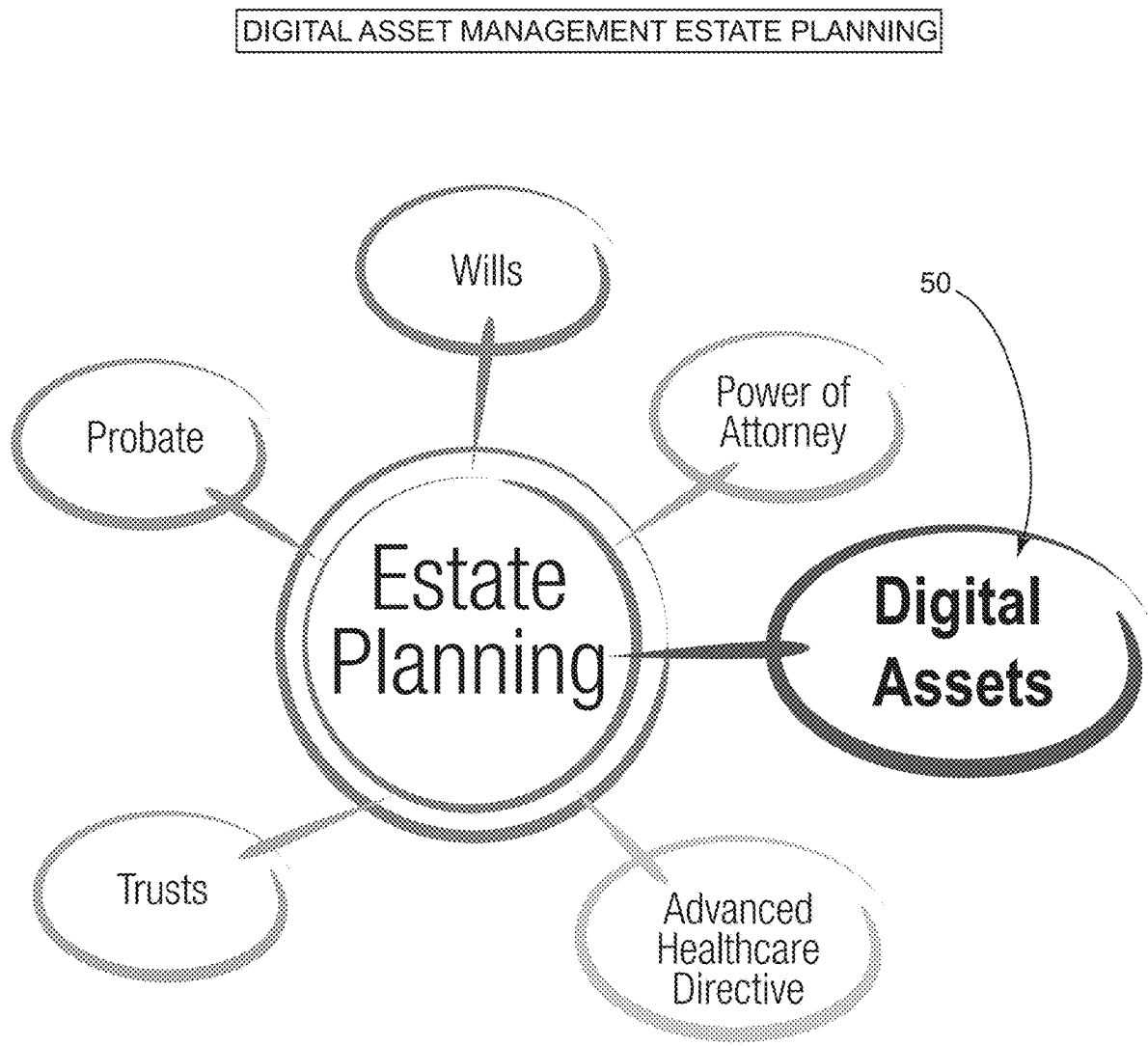
FIG. 9 is a diagrammatic view of digital assets as a part of estate planning in accordance with an embodiment.
Figure 10:
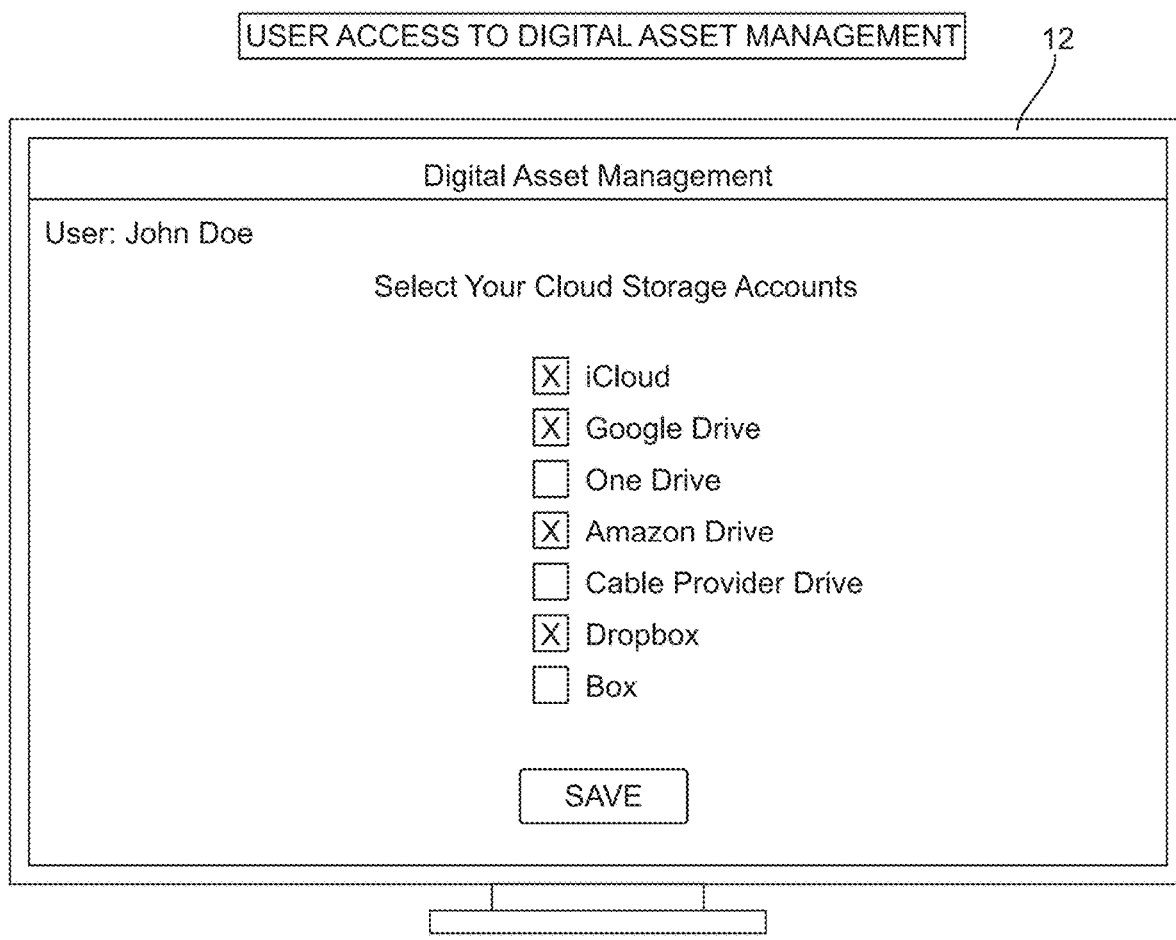
FIG. 10 is a view of a user interface on a user computing device with a user signing up for a digital asset management system in accordance with an embodiment.
Figure 11A:
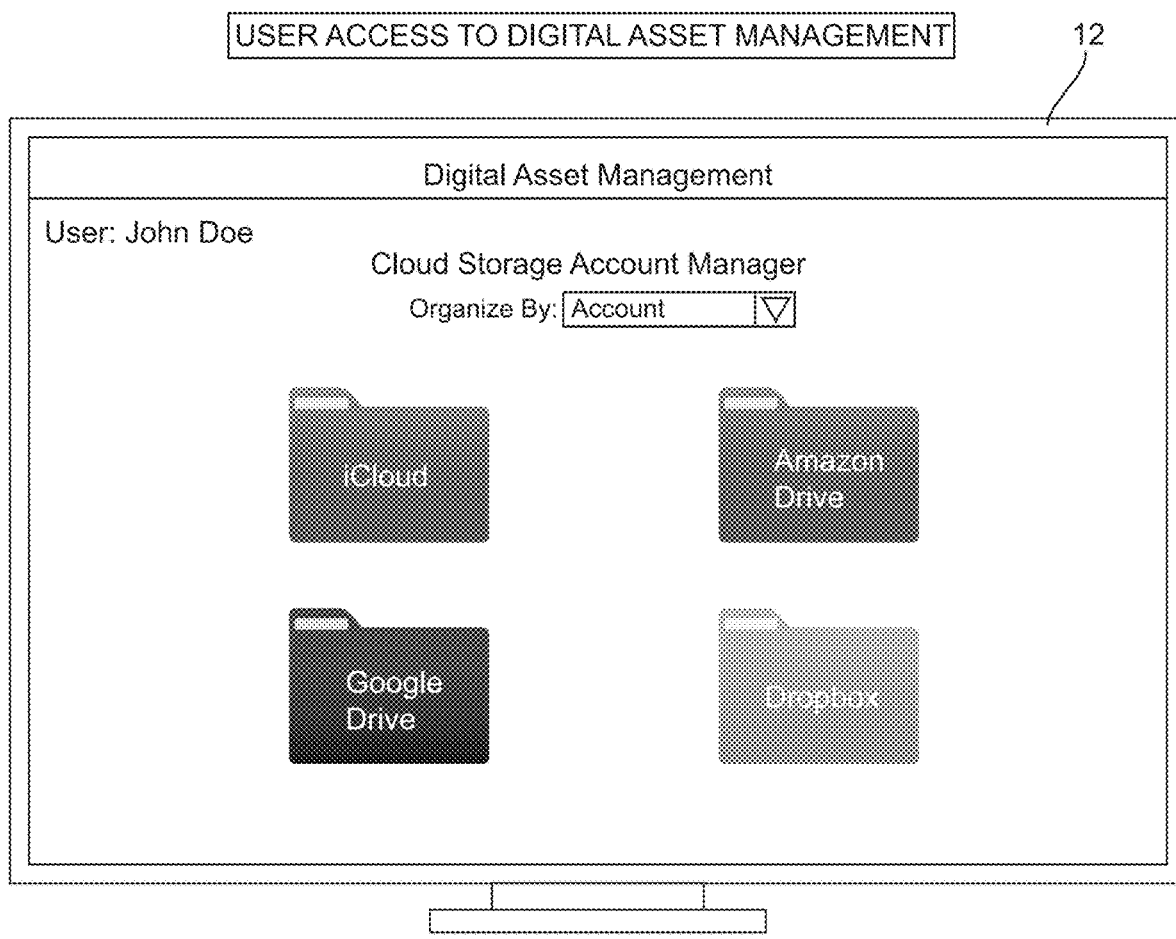
FIG. 11A is a view of a user interface on a user computing device with a user managing a digital asset management system in accordance with an embodiment.
Figure 11B:
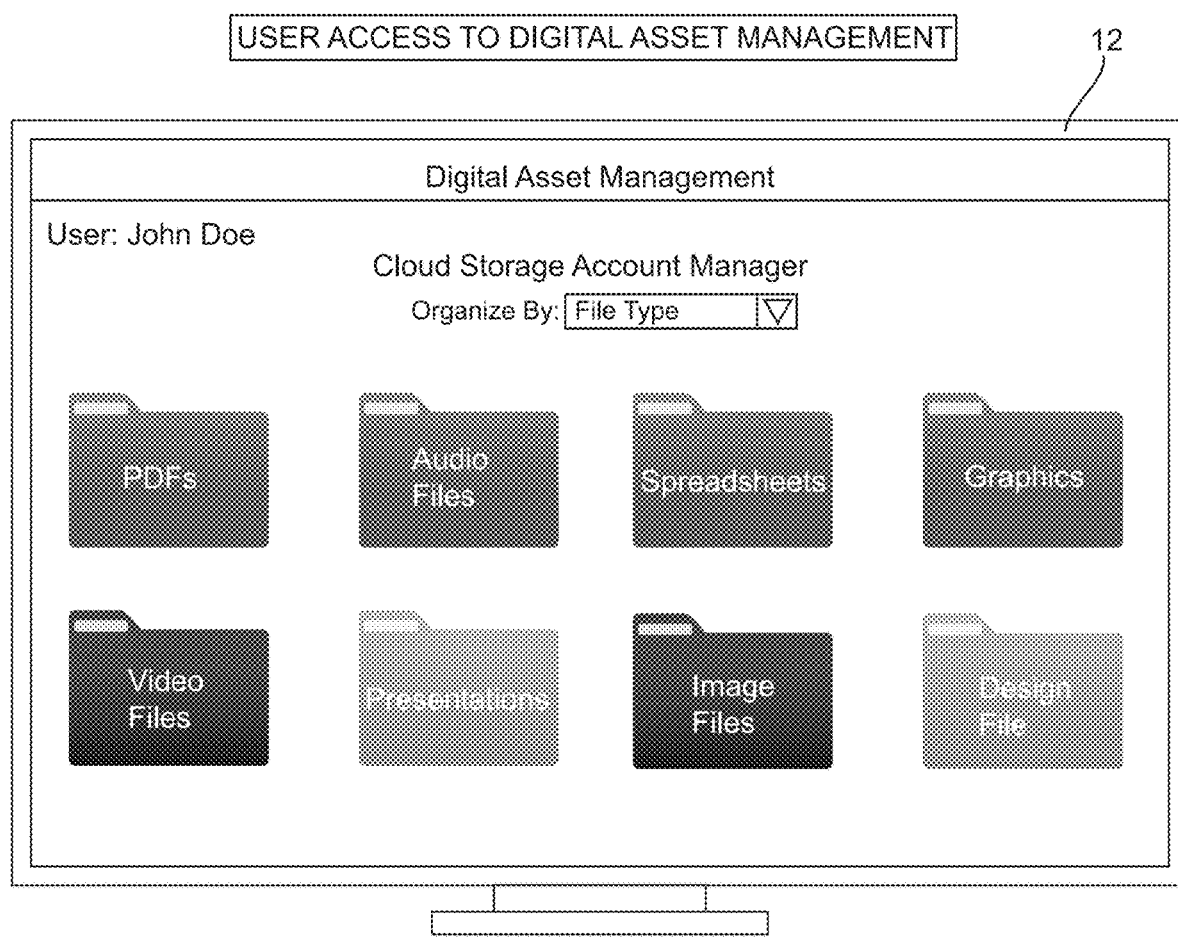
FIG. 11B is a view of a user interface on a user computing device with a user managing a digital asset management system in accordance with an embodiment.

In some embodiments, before the predetermined amount of time for closing all social media accounts, the server 14 may be programmed to send a notice to the legacy rep on his or her user computing device 13 asking the legacy rep if he or she wishes to save all data from the social media accounts to the server 14 for access by the legacy representative (see FIG. 8).

In some embodiments, the system 10 may include smart data utilized by the computer server 14 to determine the deceased's online presence or digital profile and automatically scrub the online presence or recommend how to scrub the online presence or digital profile. The computer server is programmed with algorithms that enable the computer server to immediately analyze the smart data to determine the deceased's online presence or digital footprint and take the further action. In at least this way, the system may be utilized to scrub the deceased's digital footprint. Further, the server 14 may be programmed to automatically scan the social media accounts for fraud and/or identify theft prior to the user's death and after the system 10 closes the social media accounts. The server 14 may be programmed to perform such a search at predetermined times, such as weekly, monthly, semi-annually or any longer or shorter time frame as established by the system and send a notification with results to the user computing device 12 of the user, or the user computing device 13 of legacy rep after death of the user. This fraud/identity theft may be a selectable option by the user when signing up or managing his or her account. This may also be a selectable option for a legacy representative after the death of the user.

Digital Asset Management System

Embodiments may include a digital asset management system 10. Operation of the system 10 is depicted in FIGS. 2 and 9-14. The digital asset management system 10 may also include social media final notification system as described above. In addition to this, the computer server 14 may include a memory storing user data corresponding to one or more cloud storage systems or other digital assets. The user data includes login information, such as, but not limited to, a username and a password for the one or more cloud storage systems. The user computing device 12 may be coupled to the server 14, and, referring to FIG. 2, the server 14 may be programmed to receive from the user computing device 12 a signal that the user computing device is seeking to access the system 10 and a user signup for use of the system 10 and further may include designating a legacy representative to initiate the operation of the system 10 at the user's death. The system 10 may require identification information of the legacy representative, including name, relationship to the user, address, phone number, email and a security code that the legacy representative would need to enter in order to access the system. The system 10 may operate as part of an estate planning system, self-directed software or the like (see FIG. 9).

Once the user is signed up, the user may access the system 12 wherein the server 14 delivers for display on the screen of user computing device 12 a user interface with selectable elements corresponding to available cloud storage accounts (See FIG. 10), wherein the user selects the cloud storage accounts he or she is signed up for and may be saved. The server 14 may then send for display on the user computing device 12 a user interface that allows the user to enter the login information for each of the selected cloud storage accounts. The server 14 may then aggregate and store the cloud storage files in a single location. The server 14 may be programmed to send for display on the user computing device 12 a user interface that allows a user to manage the cloud storage account files aggregated on the server 14 memory (see FIG. 11A-12B). The server 14 may be programmed to send for display on the user computing device 12 various folders of files associated with each of the cloud storage accounts (see FIG. 11A). The user may organize the files in different ways in response to server 14 receiving a signal from the user computing device 12 to organize the files in a different way such as by file type (see FIG. 11B). In embodiments, as part of estate planning and the like, the server 14 may be programmed to send for display on the user computing device 12 a user interface with input elements that allows the user to send files to specific individuals in the event of the death of the user (See FIG. 12A). This server 14 may be programmed to send for display on the user computing device 12 a user interface with input elements that allows the user to limit access by the legacy rep of certain files in the aggregated digital assets in the event of the death of the user (See FIG. 12B).

Figure 12A:
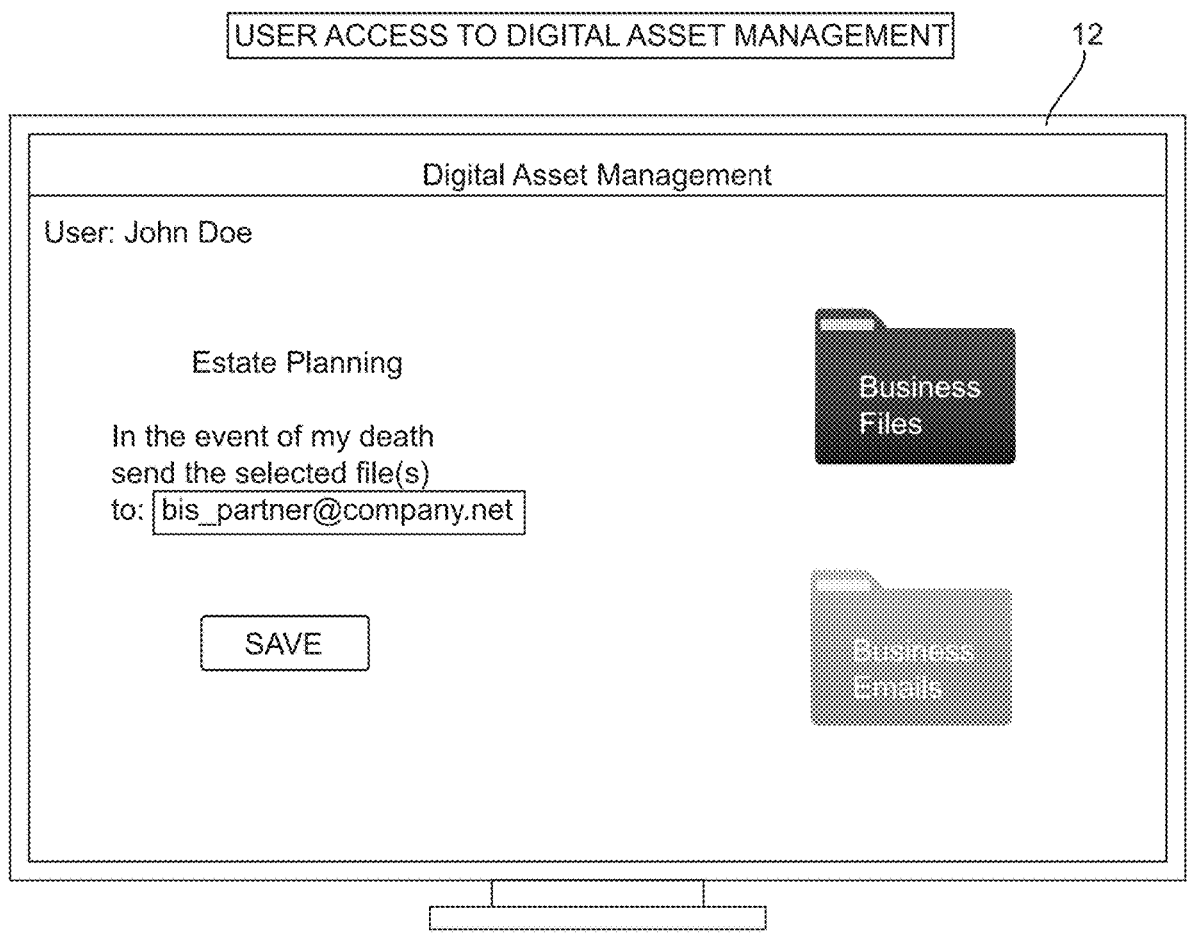
FIG. 12A is a view of a user interface on a user computing device with a user managing a digital asset management system in accordance with an embodiment.
Figure 12B:
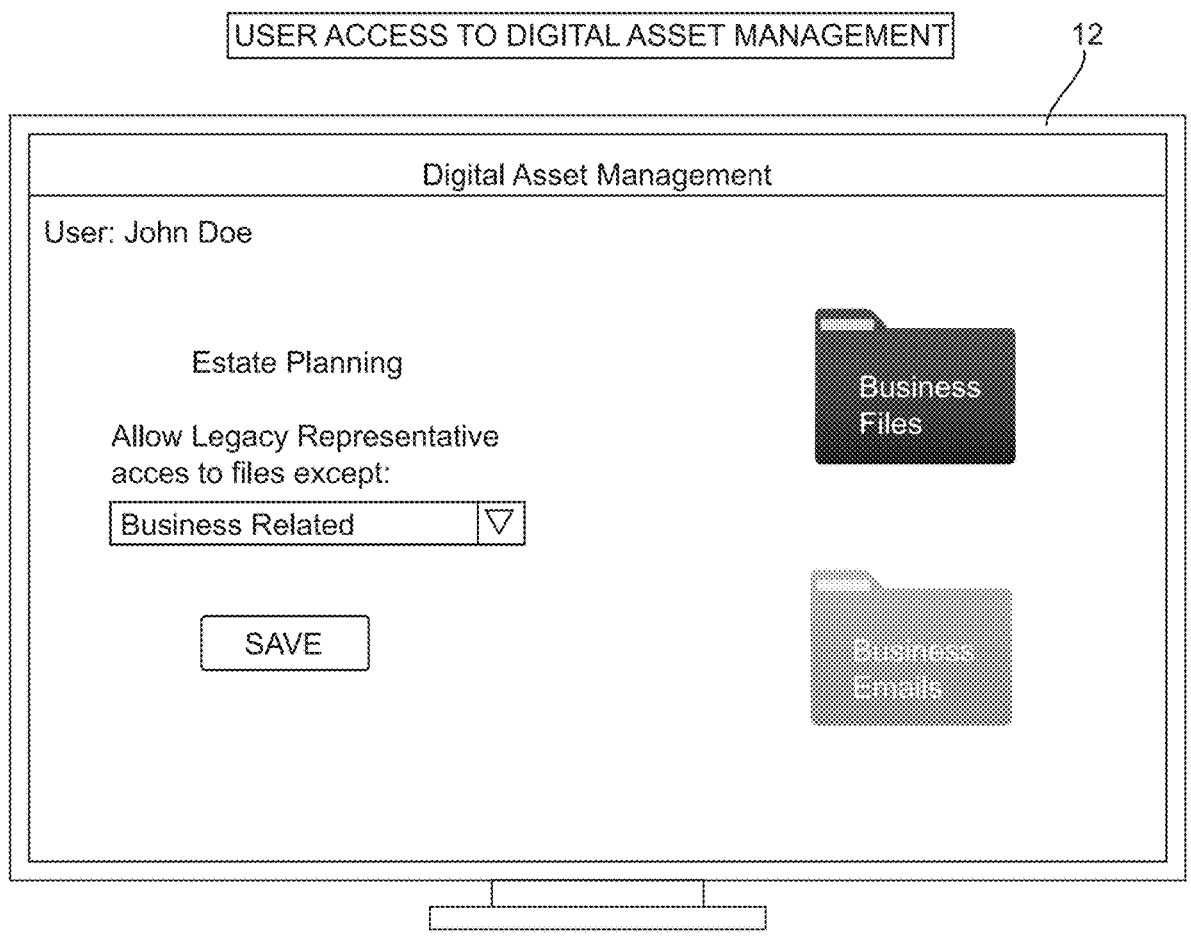
FIG. 12B is a view of a user interface on a user computing device with a user managing a digital asset management system in accordance with an embodiment.
Figure 12C:
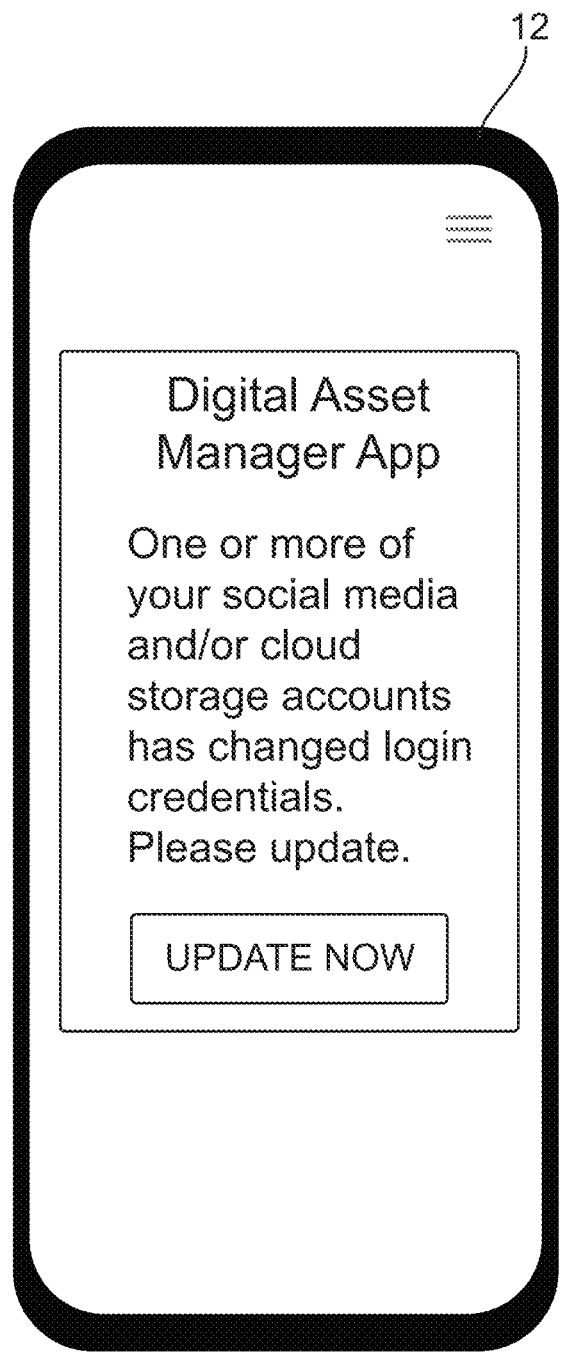
FIG. 12C is a view of a user interface on a user computing device with a notification from a digital asset management system in accordance with an embodiment.

Once the user is signed up and all digital assets, such as cloud storage files, have been saved to the system 10, the server 14 may be programmed to check the login credentials of the user to see if they are currently operable to access the one or more cloud storage accounts of the user, and to access the cloud storage account at predetermined times, such as once a day, once a week, once a month and so forth to update the aggregated digital assets stored on the server 14. In the event the server 14 cannot login to the one or more cloud storage accounts, the server 14 may send an alert to the user computing device 12, such a visual alert and/or audible alert, such as a text alert as shown in FIG. 12C, which may also include an audible or haptic alert as set by the user computing device 12. The alert may include a button allowing the user to select and then update any login credentials that have changed.

Additionally, the system 10 may include the server 14 programmed to evaluate the user's current storage demand and inform the user that he or she may need to preserve his or her files. This monitoring of storage demand may occur at predetermined times, such as weekly, monthly, semi-annually or any longer or shorter time frame as established by the system.

Figure 13A:
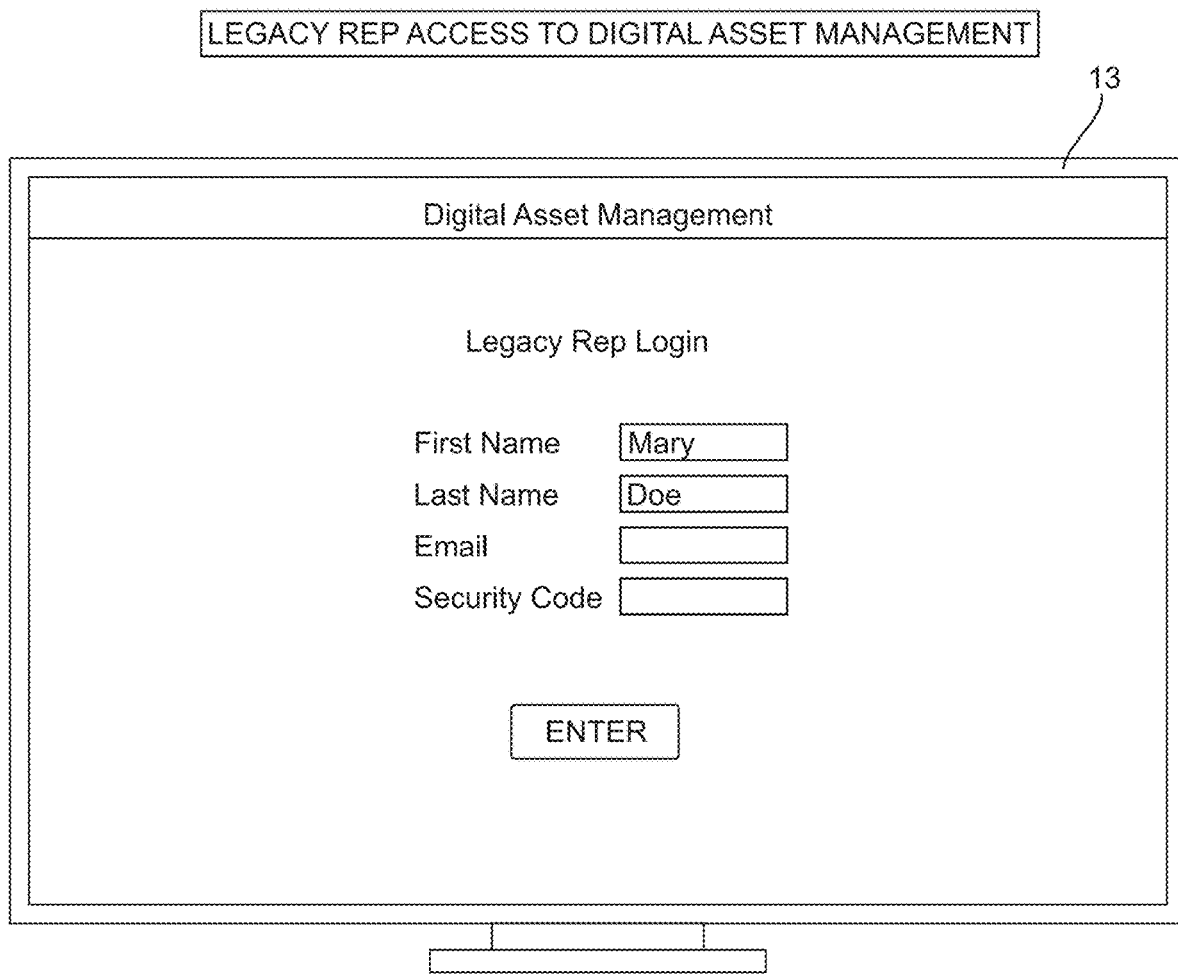
FIG. 13A is a view of a user interface on a legacy representative user computing device accessing a digital asset management system in accordance with an embodiment.
Figure 13B:
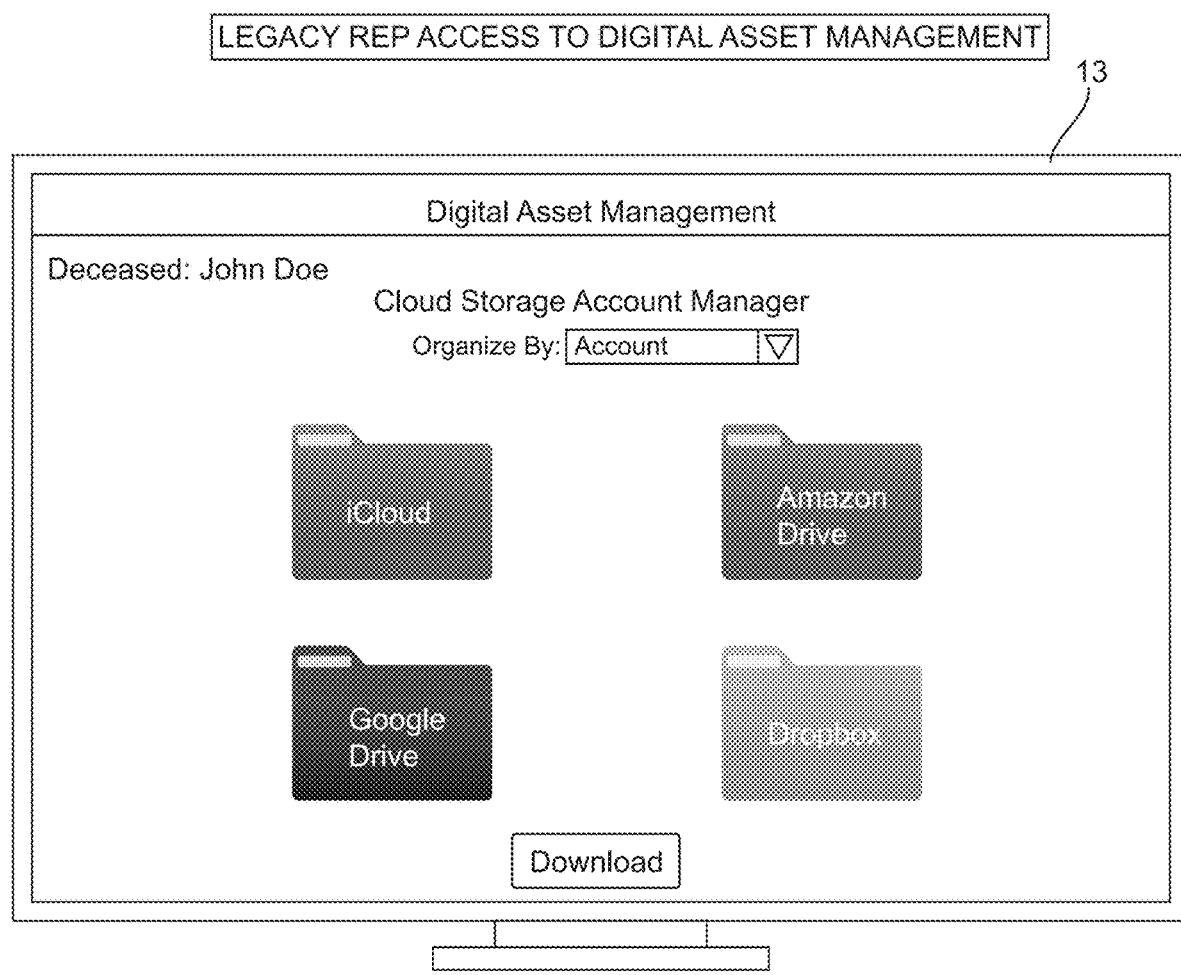
FIG. 13B is a view of a user interface on a legacy representative user computing device accessing a digital asset management system in accordance with an embodiment.
Figure 13C:
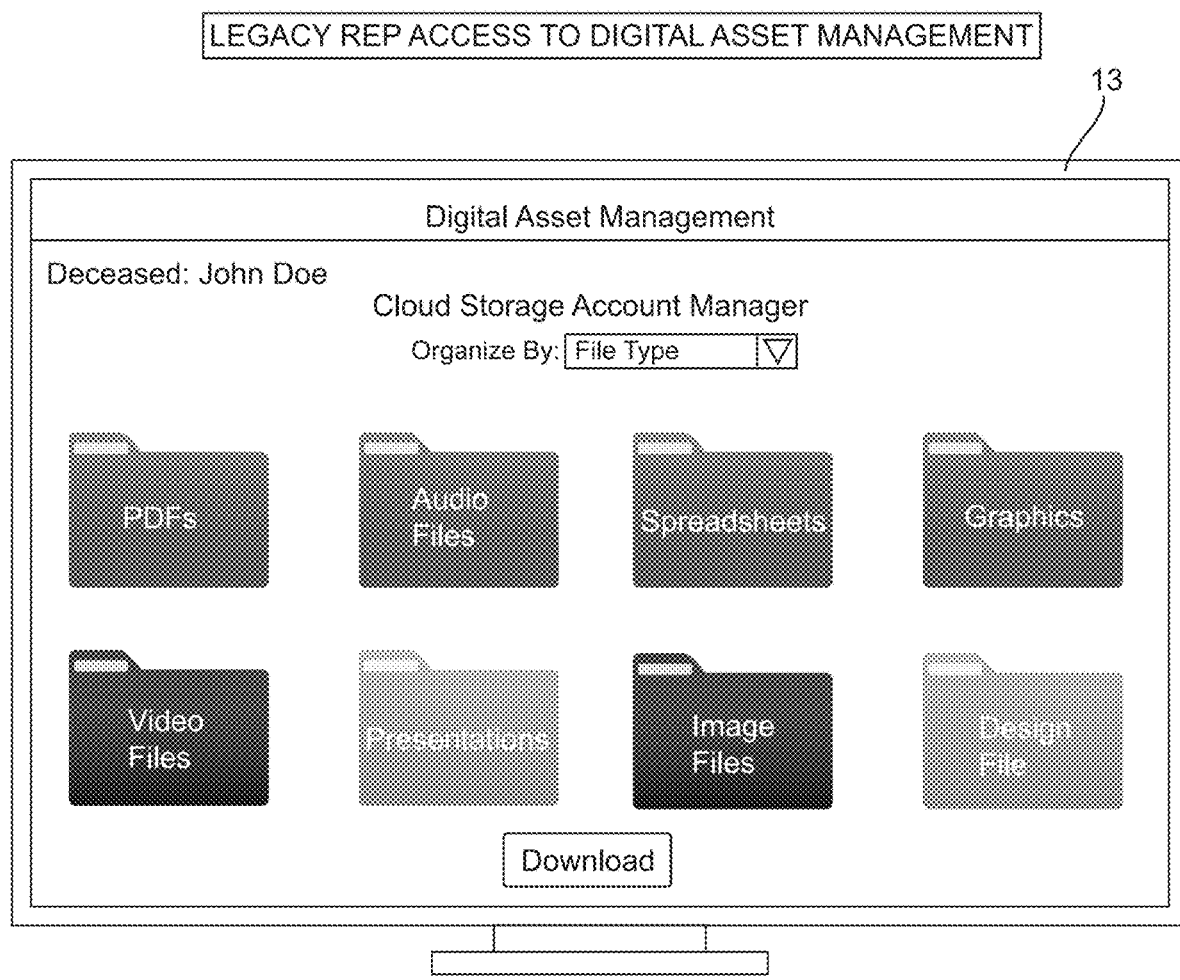
FIG. 13C is a view of a user interface on a legacy representative user computing device accessing a digital asset management system in accordance with an embodiment.
Figure 14:
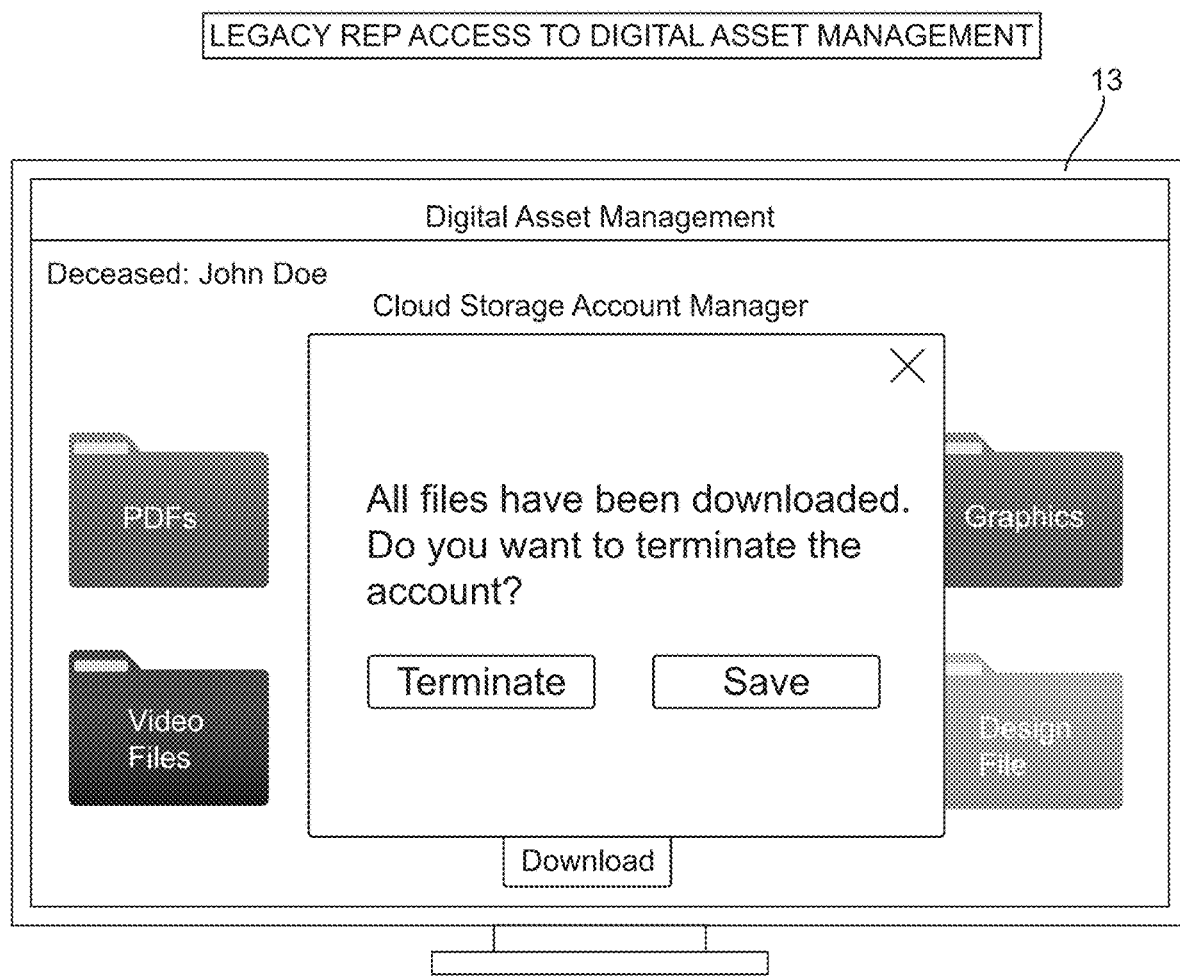
FIG. 14 is a view of a user interface on a legacy representative user computing device accessing a digital asset management system in accordance with an embodiment.

In the event of the user's death, the legacy representative may access the system 10 and couple to the server 14 through a network connection between the legacy rep user computing device 13. The legacy representative may have login credentials that may include the security code established by the user at signup for the account of the system 10 and enter the login credentials as depicted in FIG. 13A. The server 14 may be programmed to send for display on the user computing device 13 of the legacy representative various folders of files associated with each of the cloud storage accounts (see FIG. 13B). The legacy rep may organize the files in different ways in response to server 14 receiving a signal from the user computing device 13 to organize the files in a different way such as by file type (see FIG. 13C). The legacy representative may utilize the system to download the digital assets of the deceased user and store them in a different location. The legacy representative may then have the option to terminate or save the user account in the system to continue to store the digital assets. This may require additional costs paid by the legacy representative to maintain the user account.

In some embodiments, the system 10 may include smart data utilized by the computer server 14 to determine the deceased's online presence or digital profile and automatically scrub the online presence or recommend how to scrub the online presence or digital profile. This digital footprint may include social media accounts and cloud storage accounts. The computer server is programmed with algorithms that enable the computer server to immediately analyze the smart data to determine the deceased's online presence or digital footprint and take the further action. In at least this way, the system may be utilized to scrub the deceased's digital footprint. Further, the server 14 may be programmed to automatically scan the social media accounts and cloud storage accounts for fraud and/or identity theft prior to the user's death and after the system 10 closes the social media accounts. The server 14 may be programmed to perform such a search at predetermined times, such as weekly, monthly, semi-annually or any longer or shorter time frame as established by the system and send a notification with results to the user computing device 12 of the user, or the user computing device 13 of legacy rep after death of the user. This fraud/identity theft may be a selectable option by the user when signing up or managing his or her account. This may also be a selectable option for a legacy representative after the death of the user.

In embodiments of social media notification and digital asset management, the system bey be automated without a designated legacy representative, wherein the system would operate to automatically close the social media accounts and/or perform actions, including closing of cloud storage accounts once death is confirmed. This may be performed by the server 14 programmed to scan public record databases and other databases to confirm the death of a user, such as through death notices and the like. Once confirmation is completed, the server may be programmed to close all social media accounts and/or take predetermined action regarding cloud storage accounts as described above including closing the cloud storage accounts.

Further, in embodiments of social media notification and digital asset management, the server 14 may be programmed to verify the death of the user through a scan of public record databases and other databases. In some embodiments, such a verification may be required before providing access to cloud storage and digital assets of the user to the legacy representative.

Further still, digital assets of the system 10 may include phone assets, such as, but not limited to text messages, phone calls, voicemail messages and the like from a user's smartphone, cell phone or the like. These phone digital assets may aggregated on the server 14 or may otherwise be sent to the legacy representative. The server 14 may also be programmed to shut down mobile phone plans. In embodiments, the final message or a separate final message may be sent to contacts of the user or other designated phone numbers through messaging application(s) on the user's mobile device. The server 14 may be programmed to include in the final message through phone text or messaging to include the legacy representative's contact information such as phone number, email or the like.

In all embodiments of the system 10, the server 14 may be programmed to receive from a user computing device 13 of the legacy representative funeral arrangement information, charitable contributions in lieu of flowers, flowers and the like to send through the deceased user's social media accounts, such as by identifying the fiends, followers and the like and sending messages or as part of the final message or the like.

Embodiments may be available on or through the internet, such as through domain names reserved and owned by Applicant that include legacyrepresentative.com, rememberingsocial.com, rememberingsocialmedia.com, remembering.cloud, remembering.blog, legacyrep.org, legacyhelper.org, legacypal.org, legacyvault.info, legacyvault.biz, and legacyvault.mobi, or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A digital asset management system comprising:
   a computer server comprising a memory storing user data corresponding to the more than one social media platforms and more than one cloud storage accounts having digital assets aggregated in the memory of the server, wherein the user data includes login credentials, and storing legacy representative data including legacy representative login credentials;

a first user computing device operable by a first user coupled to the computer server; and a second user computing device operable by a legacy representative coupled to the computer server, the computer server programmed to:

receive from the first user computing device a signal for accessing the system and coupling the first user computing device to the server;

receive from the first user computing device a signal including the login credentials for the more than one social media platforms and the more than one cloud storage accounts and the legacy representative data including the legacy representative login credentials;

send for display on the first user computing device selectable elements corresponding to the more than one social media platforms and the more than one cloud storage accounts;

receive and store from the first user computing device instructions for the server to transfer portions of the digital assets stored in the more than one cloud storage accounts to specified individuals in the event of the first user's death and limits the legacy representative's access to the portion of the digital assets transferred;

receive from the second user computing device a signal indicating the first user associated with the user data is deceased, wherein the signal is sent without confirming documentation of the death of the first user associated with the user data;

automatically process the signal received from the second user computing device and retrieve the stored user data;

using the user data retrieved, post a final message to the more than one social media platforms, the final message saved as part of the user data as entered by the deceased person;

automatically close social media accounts within a predetermined time as determined by the deceased person and saved in the user data;

automatically transfer the portions of the digital assets to the specified individuals;

receive a signal from the second user computing device a signal to access aggregated cloud storage accounts, wherein the second user computing device operates to save the files to a different storage location, except the portions of the digital assets transferred to the specified individuals; and automatically scrub an online presence of the deceased person after closing of the more than one social media accounts.

* * * * *